UNITED STATES PATENT OFFICE.

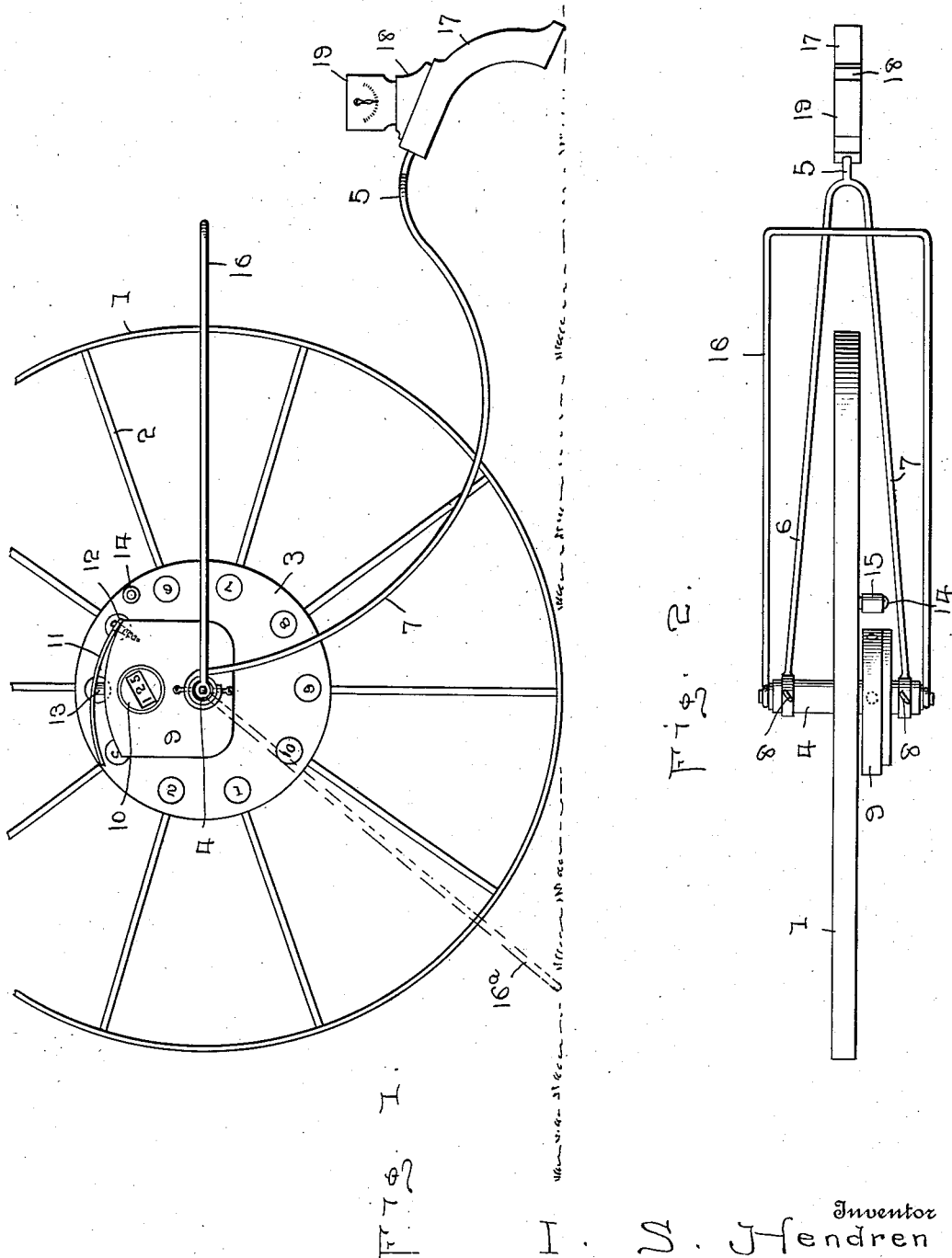

ISAAC S. HENDREN, OF HARRODSBURG, KENTUCKY.

MEASURING INSTRUMENT.

1,052,054. Specification of Letters Patent. Patented Feb. 4, 1913.

Application filed August 29, 1912. Serial No. 717,797.

*To all whom it may concern:*

Be it known that I, ISAAC S. HENDREN, a citizen of the United States, residing at Harrodsburg, in the county of Mercer and State of Kentucky, have invented certain new and useful Improvements in Measuring Instruments; and I do hereby declare the following to be a full, clear, and exact description of the invention, such as will enable others skilled in the art to which it appertains to make and use the same.

My invention relates to measuring instruments and more particularly to a tally or numbering machine, the preferred materialization whereof will be hereinafter fully set forth, illustrated in the accompanying drawings and pointed out in the claim.

My prime object, among others, is to provide a measuring machine of absolute accuracy, whereby the exact distance traveled by the measuring wheel may be readily determined and the work laid out may be of a perfect level, or of any desired degree of inclination.

A further object of my invention is to provide simple though efficient means for enabling the operator to determine at a glance the degree of inclination of the work measured, or said work may be accurately performed so as to be truly level when that result is desired.

Other objects and advantages will be hereinafter clearly set forth, reference being had to the accompanying drawings, in which;

Figure 1 shows a side elevation of my invention complete, ready for use, and, Fig. 2 is a top plan view thereof.

In order to conveniently refer to the various details of my invention and coöperating elements, numerals will be employed, the same numeral applying to the corresponding parts throughout the several views.

Referring in detail to the drawings, 1 indicates the rim of the measuring wheel, while 2 designates the spokes thereof, said parts being made in any desired manner and of any preferred material and also of any size deemed most suitable for the result sought.

I prefer to divide the circumference or rim of the wheel into ten equal parts. I prefer also to employ ten spokes entering the rim at equidistant points from each other, the said spokes being preferably numbered from one to ten. I also provide a suitable hub formation, as indicated by the plate 3 carrying the spoke numbers from one to ten, as stated, and said hub is mounted upon a suitable axle or shaft 4 of proper length to extend outwardly on each side of the wheel to afford a seat for the attachment of the bifurcated balancing member 5, the branches thereof, 6 and 7, lying on opposite sides of the wheel and having their ends properly connected to the spindle or axle 4 in any preferred way, as by the set screws 8, or equivalent means.

I also secure in any desired manner upon the axle 4 upon one side of the hub, a suitable housing 9 having a suitable seat in which I mount the numbering cyclometer or numbering machine proper 10 of any desired character. Upon the housing 9, thus or otherwise provided, I secure the spring member 11, as by a suitable screw or rivet 12, as clearly shown, the free end of said spring extending upwardly above the housing 9, whereby it will rest over the plunger 13 of the cyclometer or measuring instrument, it being understood that said plunger is extended up through the housing 9 to lie in the path of the spring 11 and, in order to actuate said spring and communicate movement to the plunger, I provide the finger or pin 14 having a suitable anti-friction roller 15, said parts being so located upon the hub as to insure that it will come in contact with the upper side of the spring member 11 and force the same downward, incidentally depressing the plunger 13 and, consequently, actuating the cyclometer.

I also provide a controlling handle for my measuring instruments the same being designated by the numeral 16 and may consist of any preferred construction, as wire of copper strength so shaped that the free ends thereof will engage each end of the spindle, leaving the remaining portion of the handle wholly out of contact with the wheel, as fully shown in Fig. 2. Obviously the handle 16 may be moved over into a position in front of the wheel, as indicated by the dotted line 16ª so that, when in this position, the wheel will be reliably held upright.

The member 5 is provided with a handle member 17 which rests upon the same plane occupied by the lower side of the wheel and upon the handle thus constructed, I form the extension 18, the upper edge of which is in a plane parallel with the plane occupied by the wheel handle 17. By this arrangement I am enabled to attach to the upper side of the extension 18 a spirit level or mechanical means 19 for indicating any desired degree of inclination of the base line traveled by the measuring wheel. The operator therefore may readily determine whether the plane occupied by the handle and wheel is horizontal or at an inclination, it being understood that suitable graduations may be provided upon the member 19 whereby the operator may at any time determine at a glance the character of the work he is measuring.

My numbering or measuring machine may be readily operated by grasping the handle 16 and causing the wheel to travel upon the object to be measured or graded, when at each revolution of the wheel the numbering device or cyclometer will be guided through the mediation of the finger 14 coming in contact with the spring 11, as before set forth.

It will thus be seen that I have provided a thoroughly reliable and efficient measuring instrument, which may be very cheaply manufactured and which will serve many useful purposes and believing that the advantages, construction and operation of my invention have thus been made clearly apparent, further description is deemed unnecessary.

What I claim as new is:

The herein described measuring machine comprising the combination of a carrying wheel, a graduated hub therefor, a spindle extending loosely through and beyond each end of the hub, a balancing member rigidly connected to the ends of the spindle, a controlling handle attached to each end of the spindle, a housing fixed to the spindle, a numbering device within the housing, a spring member carried by the housing, and an actuating finger carried by the hub to coöperate with said spring to depress the same and actuate the numbering machine carried within the housing.

In testimony whereof I have signed my name to this specification in the presence of two subscribing witnesses.

ISAAC S. HENDREN.

Witnesses:
BRENT SMOCK,
OTTO REDWITZ.